(12) United States Patent
Wang et al.

(10) Patent No.: US 11,797,781 B2
(45) Date of Patent: Oct. 24, 2023

(54) SYNTAX-BASED MULTI-LAYER LANGUAGE TRANSLATION

(71) Applicant: International Business Machines Corporation, Armonk, NY (US)

(72) Inventors: Fan Wang, Nanjing (CN); Li Cao, Beijing (CN); Enrico James Monteleone, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 16/986,704

(22) Filed: Aug. 6, 2020

(65) Prior Publication Data
US 2022/0043987 A1    Feb. 10, 2022

(51) Int. Cl.
*G06F 40/55* (2020.01)
*G06F 40/51* (2020.01)
*G06F 40/58* (2020.01)

(52) U.S. Cl.
CPC .............. *G06F 40/55* (2020.01); *G06F 40/51* (2020.01); *G06F 40/58* (2020.01)

(58) Field of Classification Search
CPC ................................................ G06F 40/40–58
See application file for complete search history.

(56) References Cited

U.S. PATENT DOCUMENTS 5,495,413 A * 2/1996 Kutsumi ............... G06F 40/211
704/4
7,827,028 B2   11/2010 Miller
8,209,163 B2 * 6/2012 Suzuki .................... G06F 40/44
704/4
8,543,374 B2   9/2013 Dymetman
(Continued)

FOREIGN PATENT DOCUMENTS

KR    20120062275 A    6/2012

OTHER PUBLICATIONS

Khalilov et al. "Syntax-based reordering for statistical machine translation". Computer Speech and Language 25 (2011) pp. 761-788 (Year: 2011).*

(Continued)

*Primary Examiner* — Jesse S Pullias
(74) *Attorney, Agent, or Firm* — Aaron Pontikos

(57) ABSTRACT

A multi-layer language translator operating in conjunction with a syntax-based model, coupled with machine learning and artificial intelligence, performs language translations from a source language text to text expressed in a target language. A relevancy-based "chunking" module breaks a source text into smaller units and applies a part-of-speech tag to some or all of the units. A hierarchy-based structuring module determines grammatical structure of the source text based, at least in part, on the applied part-of-speech tags. The hierarchy-based structuring module recursively combines grammatically linked units into one or more phrases, and applies to the phrases higher-level tags. A syntax-based translating module translates the units and/or phrases into the target language, and based on syntax differences between the source and target languages, reconfigures the translated text, as needed, such that the translated text is expressed in the target language using target language syntax rules and conventions.

15 Claims, 10 Drawing Sheets

(56) References Cited

U.S. PATENT DOCUMENTS

| | | | |
|---|---|---|---|
| 8,543,376 B2 | 9/2013 | Hwang et al. | |
| 8,818,790 B2 | 8/2014 | He et al. | |
| 9,176,952 B2* | 11/2015 | Aikawa | G06F 40/289 |
| 10,133,737 B2 | 11/2018 | Brawer et al. | |
| 10,198,437 B2* | 2/2019 | Hwang | G06F 40/44 |
| 2003/0023423 A1* | 1/2003 | Yamada | G06F 40/44 |
| | | | 704/2 |
| 2006/0095248 A1 | 5/2006 | Menezes et al. | |
| 2012/0316862 A1 | 12/2012 | Sultan et al. | |

OTHER PUBLICATIONS

Imamura et al. "Feedback Cleaning of Machine Translation Rules Using Automatic Evaluation". Proceedings of the 41st Annual Meeting of the Association for Computational Linguistics, Jul. 2003 (Year: 2003).*

Sudoh et al. "Post-ordering in Statistical Machine Translation". In proceedings of the 13th Machine Translation Summit, 2011 (Year: 2011).*

Goto et al. "Post-Ordering by Parsing with ITG for Japanese-English Statistical Machine Translation". ACM Transactions on Asian Language Information Processing, vol. 12, Issue 4, Article No. 17, pp. 1-22, 2013 (Year: 2013).*

Bisazza et al. "A Survey of Word Reordering in Statistical Machine Translation: Computation Models and Language Phenomena". Computational Linguistics, vol. 42, No. 2, pp. 163-205, 2016 (Year: 2016).*

Yamada et al., "A syntax-based statistical translation model", Digital Library, Jul. 2001, 8 pages, <https://dl.acm.org/doi/10.3115/1073012.1073079>.

* cited by examiner

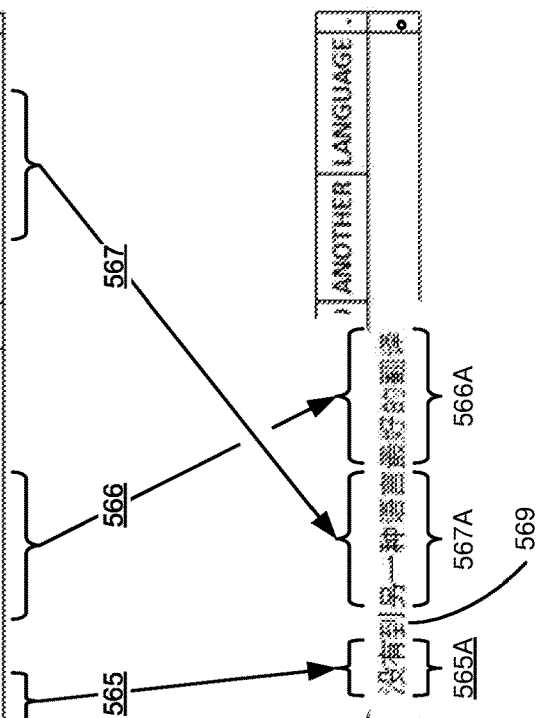
FIG. 6F
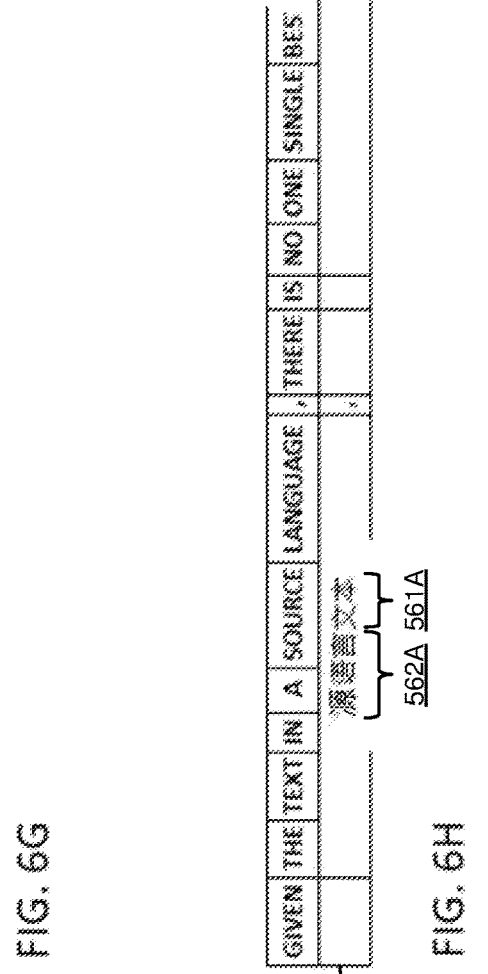
FIG. 6G
FIG. 6H

| TAG | APPLICATION |
|---|---|
| CC | conjunction, coordinating |
| CD | numeral, cardinal |
| DT | determiner |
| IN | preposition or conjunction, subordinating |
| JJ | adjective or numeral, ordinal |
| JJR | adjective, comparative |
| JJS | adjective, superlative |
| MD | modal auxiliary |
| NN | noun, common, singular or mass |
| NNP | noun, proper, singular |
| NNPS | noun, proper, plural |
| NNS | noun, common, plural |
| NP | noun phrase |
| PRP | pronoun, personal |
| PRP$ | pronoun, possessive |
| RB | adverb |
| RBR | adverb, comparative |
| RBS | adverb, superlative |
| TO | "to" as preposition or infinitive marker |
| VB | verb, base form |
| VBD | verb, past tense |
| VBG | verb, present participle or gerund |
| VBN | verb, past participle |
| VBP | verb, present tense, not 3rd person singular |
| VBZ | verb, present tense, 3rd person singular |
| WDT | WH-determiner |
| WP | WH-pronoun |
| WP$ | WH-pronoun, possessive |
| WRB | WH-adverb |

Fig. 7

SYNTAX-BASED MULTI-LAYER LANGUAGE TRANSLATION

BACKGROUND

The present invention relates generally to the field of artificial intelligence, and more particularly to the field of translating spoken or written words from a source language to a target language.

To translate a written text from one human language into another, different machine translation systems and approaches have been developed with varying degrees of success. Some systems for example, are based on neural networks, corpora of cross-language equivalencies, phrase-based translation, and example-based translation. A goal of language translation is to produce a target language passage that accurately conveys the meaning present in a source language passage.

SUMMARY

According to an aspect of the present invention, there is a method, computer program product and/or system that performs the following operations (not necessarily in the following order): (i) receiving, by one or more processors: (a) information indicating a target language, (b) a source text, expressed in a source language, comprising a plurality of elements including a first element, and a second element, (c) information indicating source language syntax rules and conventions, and (d) information indicating target language syntax rules and conventions; (ii) classifying, by the one or more processors, the first element and the second element based on respectively corresponding grammatical functions thereof; (iii) identifying, by the one or more processors, a syntactical structure of the source text based on the source language syntax rules and conventions; (iv) identifying, by the one or more processors, and based on the syntactical structure of the source text, a phrase comprising a combination of the first element and the second element; (v) generating, by the one or more processors, a respectively corresponding translated phrase by translating the phrase to the target language; (vi) generating, by the one or more processors, an interim target text, expressed in the target language, comprising the translated phrase; (vii) reconfiguring, by the one or more processors, the interim target text, based on the target language syntax rules and conventions to generate a target text; and (viii) outputting, by the one or more processors, the target text.

BRIEF DESCRIPTION OF THE DRAWINGS

FIG. 6F shows at least a portion of an example translation, implemented by a translating module, in accordance with at least one embodiment of the present invention;

FIG. 6G shows at least a portion of an example translation, implemented by a translating module, in accordance with at least one embodiment of the present invention;

FIG. 6H shows at least a portion of an example translation, implemented by a translating module, in accordance with at least one embodiment of the present invention; and FIG. 7 shows a plurality of part-of-speech tags, in accordance with at least one embodiment of the present invention.

DETAILED DESCRIPTION

Figure 1:
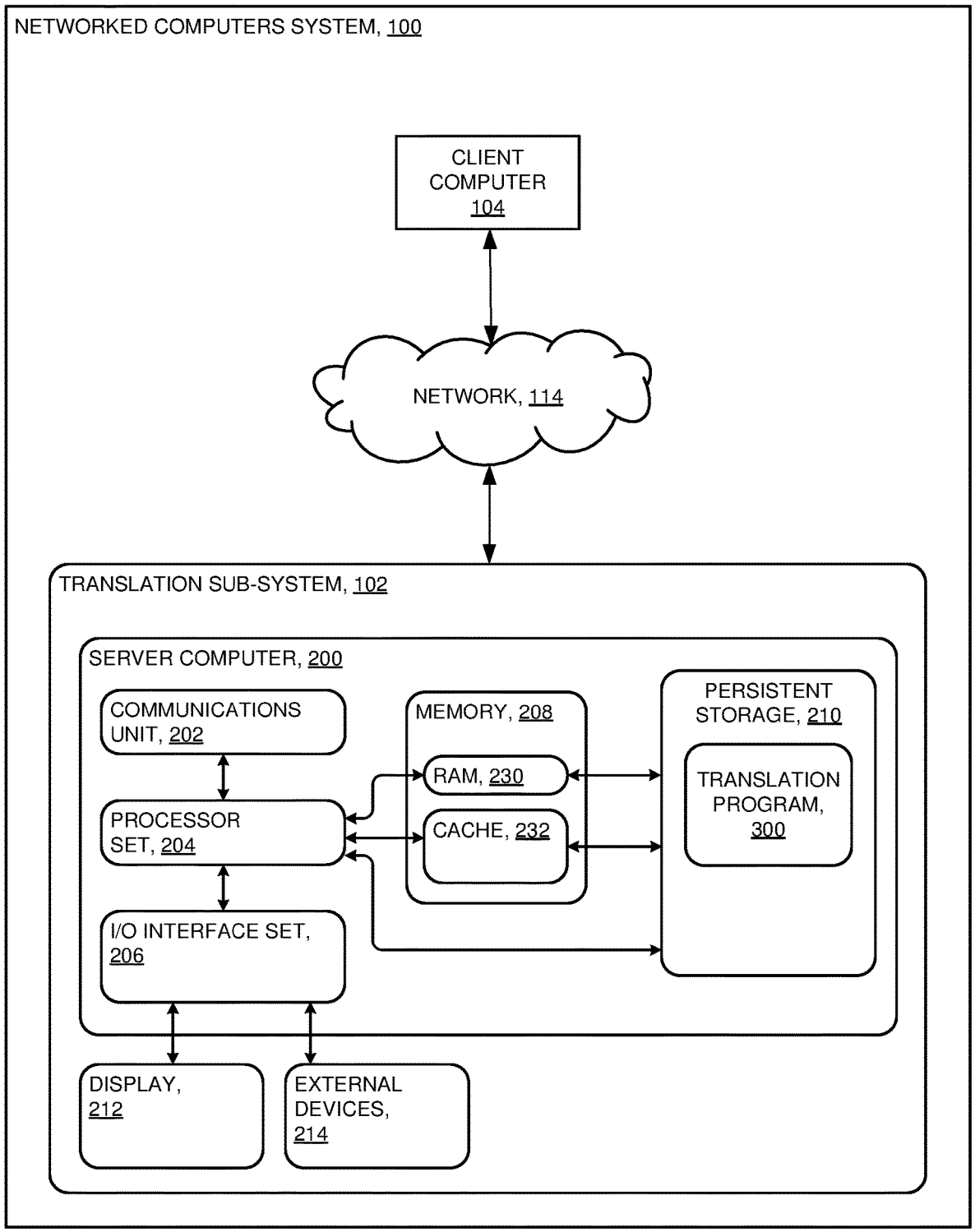
FIG. 1 is a block diagram of a system in accordance with at least one embodiment of the present invention.

Some embodiments of the present invention support language translation by machine, with syntax-based analysis, sentence structure extraction and multi-layer adjustment. The approach comprises three modules that operate, with respect to source language input text: (i) a relevancy-based chunking module—identifies noun phrases and verb phrases included in the input text; (ii) a hierarchy-based structuring module—adds hierarchical tags and extracts sentence structure of the input text; and (iii) a syntax-based translating module—translates noun and verb phrases to a target language, and re-configures the output text in accordance with syntax rules and conventions of the target language.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: translation sub-system 102; client computer 104; communication network 114; server computer 200; communications unit 202; processor set 204; input/output (I/O) interface set 206; memory device 208; persistent storage device 210; display device 212; external devices 214; random access memory (RAM 230); cache 232; and translation program 300.

Translation sub-system 102 is, in many respects, representative of the various computer sub-system(s) in the present invention. Accordingly, several portions of translation sub-system 102 will now be discussed in the following paragraphs.

Translation sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Program 300 is a collection of machine readable instructions and/or data that is used to create, manage, and control certain software functions that will be discussed in detail, below, in the Example Embodiment sub-section of this Detailed Description section.

Translation sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Translation sub-system 102 is shown as a block diagram with many double arrows. These double arrows (no separate reference numerals) represent a communications fabric, which provides communications between various components of translation sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for translation sub-system 102; and/or (ii) devices external to translation sub-system 102 may be able to provide memory for translation sub-system 102.

Program 300 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to translation sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external devices 214. External devices 214 will may include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
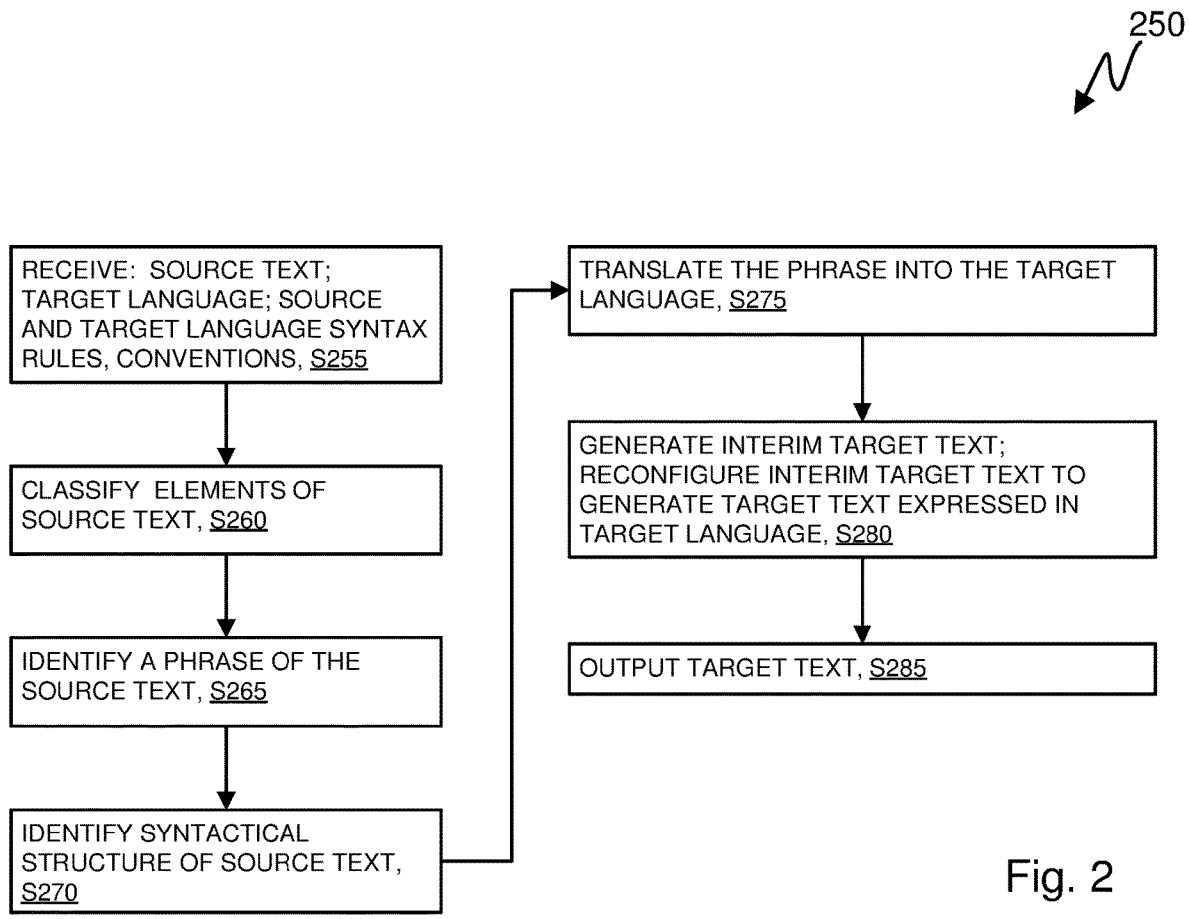
FIG. 2 is a flowchart showing a method performed, at least in part, in accordance with at least one embodiment of the present invention.
Figure 3:
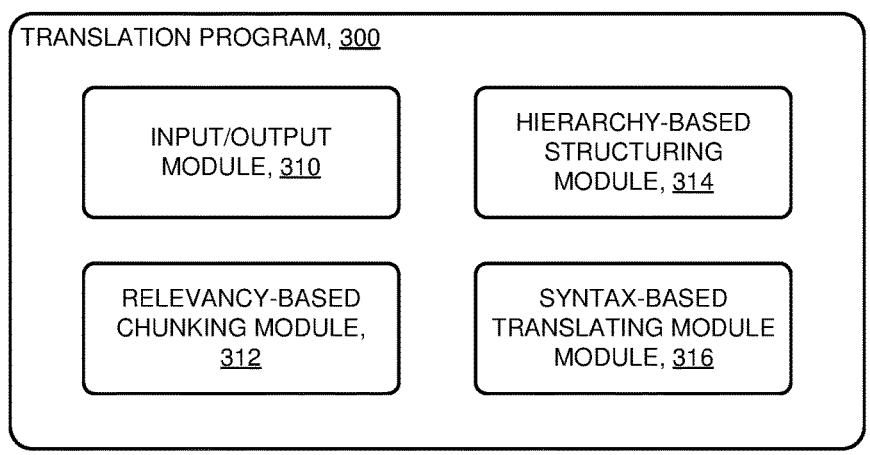
FIG. 3 is a block diagram showing a machine logic (for example, software) portion of a system in accordance with at least one embodiment of the present invention.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where input/output (I/O) module 310, of translation program 300, receives: (i) a source text (expressed in a source language, see FIG. 6A, bottom row, sentence 520) comprising a plurality of elements, including a first element, and a second element; (ii) a specified target language; (iii) source language syntax rules and conventions; and/or (iv) target language syntax rules and conventions. In some embodiments, the textual unit is a sentence, written expression, or phrase expressing a thought, concept, statement, question, command, suggestion, etc. In the present example embodiment, an element of the source text may be an individual word, or a combination of words that are grammatically linked.

In some languages, syntax rules are loosely codified, and regional conventions (and colloquialisms) influence spoken and written expressions.

In some embodiments, each element of a textual unit comprises a word, logogram, written character (or series of characters collectively) or any other written form that represents a word or phrase (for example, a character in a non-alphabetic language such as a pictographically- or logographically-based language).

Processing proceeds at operation S260, where relevancy-based chunking module 312, of translation program 300, classifies at least a subset of elements of the plurality of elements of the source text, based on respective grammatical properties (grammatical functions) of the elements. In some embodiments, classifying each element comprises: (i) analyzing the plurality of elements to determine grammatical properties of each element in the context of the source text; and (ii) based on results of the analysis, applying a part-of-speech tag (POS tag, see FIG. 6A, row 521 and FIG. 7) to some or all of the words (or logograms in a non-alphabetic language, etc.) of the source text. For reference, FIG. 7 shows a subset of POS tags and associated meanings as defined in the Natural Language Toolkit (NLTK; see Bird, Steven, Edward Loper and Ewan Klein (2009), *Natural Language Processing with Python*. O'Reilly Media Inc.). In a non-alphabetic language, elements may include individual characters, logograms, and/or combinations thereof. Examples of grammatical properties (in some languages) of a word include the part of speech associated with the word (in context), such as noun, verb, adjective, adverb, pronoun, etc. For nouns (in some languages), some properties include finiteness, number and grammatical case. For verbs (in some languages), properties include tense, number, and person.

Processing proceeds at operation S265, where relevancy-based chunking module 312, of translation program 300, identifies a phrase based on a combination of the first element and the second element. For examples, see FIG. 6B, noun phrase NP_1 552 ("a source language"), and noun phrase NP_1 555 ("another language").

In some embodiments, relevancy-based chunking module 312 identifies individual words and/or certain phrases as "chunks". In other words, relevancy-based chunking module 312 breaks down the source text into a series of chunks, where each chunk comprises a single word, or a combination of consecutive words of the sentence. The term "chunking" herein means identifying, in a textual unit, single words and/or groups of words that are grammatically linked or connected. For groups of words, the grouped words (collectively, a "chunk") can be identified and/or processed as a single concept. For example, consider the sentence: "Given the text in a source language, there is no one single best translation of that text to another language." The words "source" and the first occurrence of "language" are grammatically connected, and may be "chunked" together into the phrase (the chunk) "source language" as a single concept. Other identifiable chunks in the example sentence include individual words, and the phrases "no one single best translation" and "another language". Further discussion is given below, with reference to FIGS. 6A through 6H, in the Further Comments and/or Embodiments subsection of this Detailed Description section.

Processing proceeds at operation S270, where hierarchy-based structuring module 314 identifies syntactical structure of the source text based, at least in part on the source language syntax rules and conventions.

Processing proceeds at operation S275, where syntax-based translating module 316, of translation program 300, translates the phrase into the target language to generate a translated phrase. In some embodiments, syntax-based translating module 316 performs the translations based on information in parallel corpus 502 and/or aligned corpus 506 (see FIG. 5A and corresponding description below in the Further Comments and/or Embodiments subsection of this Detailed Description section.)

Processing proceeds at operation S280, where syntax-based translating module 316, of translation program 300, generates an interim target text comprising the translated phrase. Syntax-based translating module 316 reconfigures the interim target text in accordance with the target language syntax rules and conventions, to generate a target text expressed in the target language. The target text is equivalent in meaning, or nearly equivalent, to the source language text.

Processing proceeds at operation S285, where input/output (I/O) module 310, of translation program 300, outputs the target text.

III. Further Comments and/or Embodiments

A syntax-based multi-layer statistical machine translation method in accordance with some embodiments of the present invention includes: (i) a tag relevancy-based module to train and extract general semantic syntax rules of a given language; (ii) a hierarchy-based structuring module to generalize semantic syntax models of multiple languages; and (iii) a syntax-based module to adjust the translated sentence structure based on the semantic syntax rules of the target language.

In some embodiments, a relevancy-based chunking module performs the following operations on a source language text: (i) trains a chunking model on sentence corpus; (ii) adds referential and/or functional part-of-speech tags to elements of the source language text; and/or (iii) forms chunks (that is identifies combinations of words, of the source language text, that are grammatically linked) based on relevancy rules.

In some embodiments, a hierarchy-based structuring module performs the following operations on a source language text: (i) trains a structuring model on sentence corpus; and/or (ii) adds chunks with hierarchical tags and extracts sentence structure from the source language text.

In some embodiments, a syntax-base translating module performs the following operations on a source language text: (i) trains the translating module as to structure-level alignments; (ii) translates chunks of the source language text (determined previously), and adjusts respective positions thereof, in the translated result, in accordance with syntax rules of the target language.

Some embodiments of the present invention use syntax throughout translation processing, which enables machine translation with better capability (as compared to conventional translation approaches) to cope with syntax differences among languages.

A method in accordance with some embodiments perform the following operations: (i) a "chunking layer" receives an input text (for example, a sentence), analyzes the text to identify parts of speech (POS), and applies referential and/or functional tags to the words of the text; (ii) the chunking layer uses known tag connection rules to form chunks (a chunk is a contiguous group of words, within the text, that are semantically and/or syntactically related); (iii) iterates step (ii) above, based on step (iii) results, until relevancy tags are confirmed with full syntax; (iv) a translating layer translates results of step (iii) based on hierarchy and dependency relationships among the chunks; (v) an ordering layer adjusts step (iv) results according to syntax rules of the target language; and outputs the translated text in the target language.

Some embodiments of the present invention combine a multi-layer syntax-based model translation approach with statistical machine translation, to achieve consistent translation results.

Some embodiments of the present invention may recognize one, or more, of the following facts, potential problems, and/or potential areas for improvement with respect to the current state of the art: (i) may render a translated passage in the target language using poor vocabulary, grammar, syntax, and/or sentence structure; (ii) may distort or alter the meaning of the original passage; (iii) may provide no option for user input to achieve improved translation quality; (iv) may lack ability to cope with syntax differences among different languages; (v) may not properly translate complex sentences, having for example long dependency, ambiguous pronoun(s) and/or syntax differences between source and target languages; (vi) may produce "translation-ese" (presence of unusual features, awkward syntax, and other defects) in the translated output; (vii) may not properly understand and manipulate sentence structures and syntax between source and target languages; and/or (viii) may determine a "most likely" translation based only on corpora training results, which may produce rigid translated text that does not conform to the sentence structures of the target language.

Some embodiments of the present invention may include one, or more, of the following features, characteristics, and/or advantages: (i) a relevancy-based tagging module trains and extracts general semantic syntax rules of a given language; (ii) a hierarchy-based module generalizes semantic syntax models of multiple languages; and/or (iii) a syntax-based module adjusts the sentence structure of a translation, based on the semantic syntax rules.

Some embodiments of the present invention support machine translation with syntax-based analysis, sentence structure extraction and multi-layer translation adjustment. Translation of a sentence begins by first tokenizing the sentence and adding to each token a referential or functional part of speech (POS) tag. Based on tag relevancy rules, portions of the sentence (herein referred to as "chunks") identified as noun phrases and verb phrases are identified as referential. Other chunks are identified as functional, to be further categorized. Then hierarchical tags are added to the chunks by analyzing together with functional tags; the sentence structure is identified. Based on structure alignments between language pairs, a most likely target language structure is determined. The chunks are then translated and arranged positionally based on the hierarchical tags, completing the translation.

Figure 4:
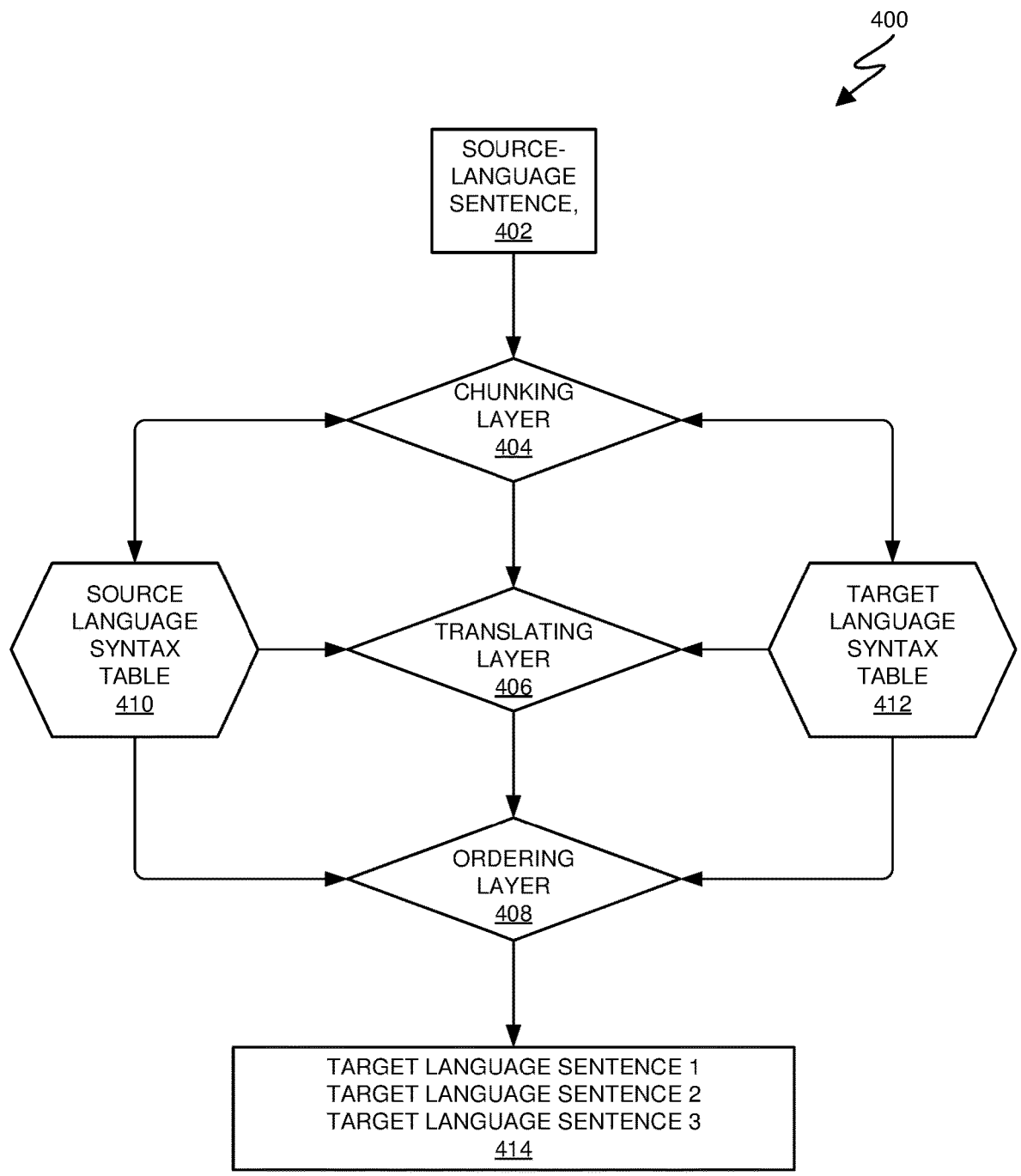
FIG. 4 is a flowchart showing a method performed, at least in part, in accordance with at least one embodiment of the present invention.

Flowchart 400 of FIG. 4 shows an approach in accordance with some embodiments of the present invention. Processing begins at operation 402 where input/output module 310, of translation program 300 (see FIG. 3), receives a source-language textual unit (for example, a sentence, phrase, idiom, etc.).

Processing proceeds at operation 404 (chunking layer) where relevancy-based chunking module 312 (see FIG. 3) identifies parts of speech (POS) associated with words of the text, and applies referential and/or functional tags to the words, based at least in part, on information in source language syntax table 410 and/or target language syntax table 412. Relevancy-based chunking module 312 breaks the text into chunks based on the various parts of speech.

Relevancy-based chunking module 312 performs the following operations: (i) tokenizes the input sentence; (ii) associates with each token a referential or functional part of speech (POS) tag, which is later used for hierarchical tagging; (iii) based on tag relevancy rules, identifies as "referential" those sentence chunks that are determined to be noun phrases and verb phrases; and/or (iv) leaves the remainder of the sentence as "functional" to be further categorized.

Processing proceeds at operation 406 (translating layer) where syntax-based translating module 316 (see FIG. 3), translates the chunks, determined in operation 404 above, based at least in part on information in source language syntax table 410 and/or target language syntax table 412. Syntax-based translating module 316 (see FIG. 3) translates the chunks, and adjusts positions thereof within the translated text, based on sentence structure and syntax of the target language.

Processing proceeds at operation 408 (ordering layer) where hierarchy-based structuring module 314 (see FIG. 3) arranges the translated chunks determined in operation 406 above, based at least in part on information in source language syntax table 410 and/or target language syntax table 412. Hierarchy-based structuring module 314 adds hierarchical tags to sentence chunks that may be further linked with certain types of token. The sentence is fully analyzed once the sentence structure and hierarchical chunks have been acquired. In some embodiments, hierarchy-based structuring module 314 generates more than one translated sentence structure, due to ambiguities (such as ambiguous pronoun(s), etc.) present in the source language text.

Processing proceeds at operation 414 where input/output module 310 outputs the translated text. If more than one translated sentence structure is generated at operation 408 above, input/output module 310 sends all of the translated sentence structures for review by a human operator. The human operator determines which one is the best translation. Feedback given by the human operator is fed back to translation program 300 (see FIG. 3) to provide information which translating layer and ordering layer subsequently use to incrementally improve translation quality as time progresses. Some embodiments modify one or both of the source language and target language syntax tables, based on the feedback from the human operator.

Figure 5A:
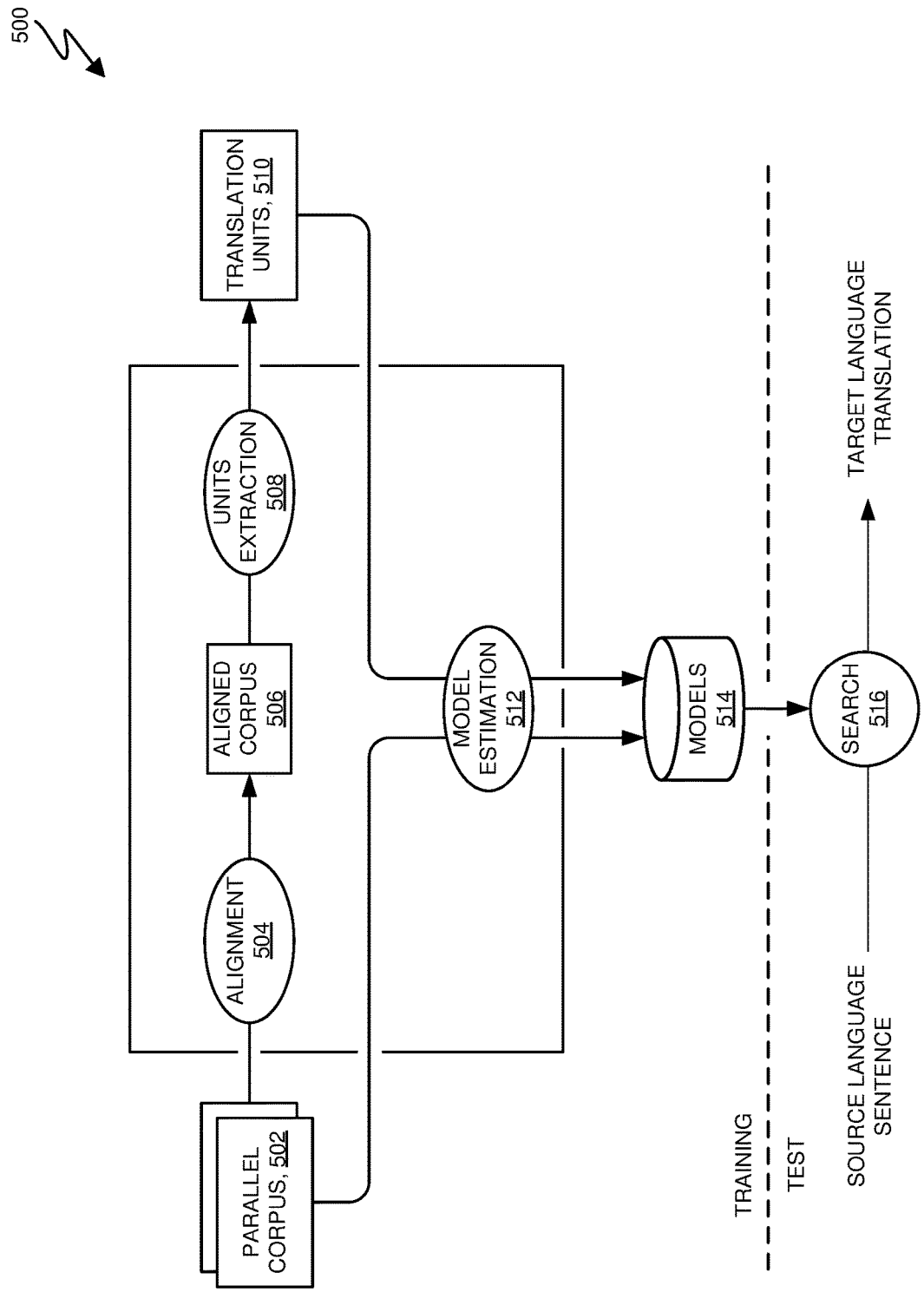
FIG. 5A is a block diagram showing at least a portion of a system workflow in accordance with at least one embodiment of the present invention.

Block diagram 500, of FIG. 5A shows an overall workflow in accordance with some embodiments of the present invention. Block diagram 500 comprises the following components:
(i) parallel corpus 502—a text-level corpus that contains texts in language pairs, for example a word or phrase in a first language and an equivalent word or phrase in a second language; (ii) alignment 504—provides alignment and correspondences between parallel corpus 502 and aligned corpus 506 (see FIG. 6E for further information); (iii) aligned corpus 506—sentence-level corpus that contains sentences in a language pairs, for example a sentence in the first language and an equivalent sentence in the second language—aligned corpus 506 is described in more detail below with respect to FIG. 5B; (iv) units extraction 508—extracts words or phrases from an input text in a first language that are matched and translated into corresponding words or phrases in the second language; (v) translation units 510—results of the units extraction 508 (above), for example matches a word or phrase in the first language and translates in corpora as an equivalent word or phrase in the second language; (vi) model estimation 512—trains the model as to how translation units are distributed in the corpus; (vii) models 514—after estimation, and once the model is deployed, the model knows, based on statistics, where a candidate unilingual multi-word unit is probably stored (for example in parallel corpus 502, aligned corpus 506) and the correspondences leading to the bilingual translation; and/or (viii) search 516—enables the model to find multi-word units in the target language text that correspond to the multi-word units in the source language text.

The training structure (above the dotted line) teaches the model using known translation units and information as to how the translation units are placed in the corpora (parallel corpus 502 and/or aligned corpus 506). Testing (below the dotted line) evaluates the accuracy of the model, based on testing data (a large volume of input text) that is unknown to the model (unlike the training data that is known to the model), to determine the accuracy of the model. In some embodiments, information developed during testing is fed back into parallel corpus 502, aligned corpus 506, and/or translation units 510.

Some embodiments assist in the alignment process (as opposed to statistically determining translation unit placements) by extracting the phrases based on the linguistic analysis (chunks) combined with information as to how they are linked by statistics (sentence structures). Mapping the chunks and sentence structures, therefore helps to provide translations that are more in keeping with native spoken and/or written language.

Figure 5B:
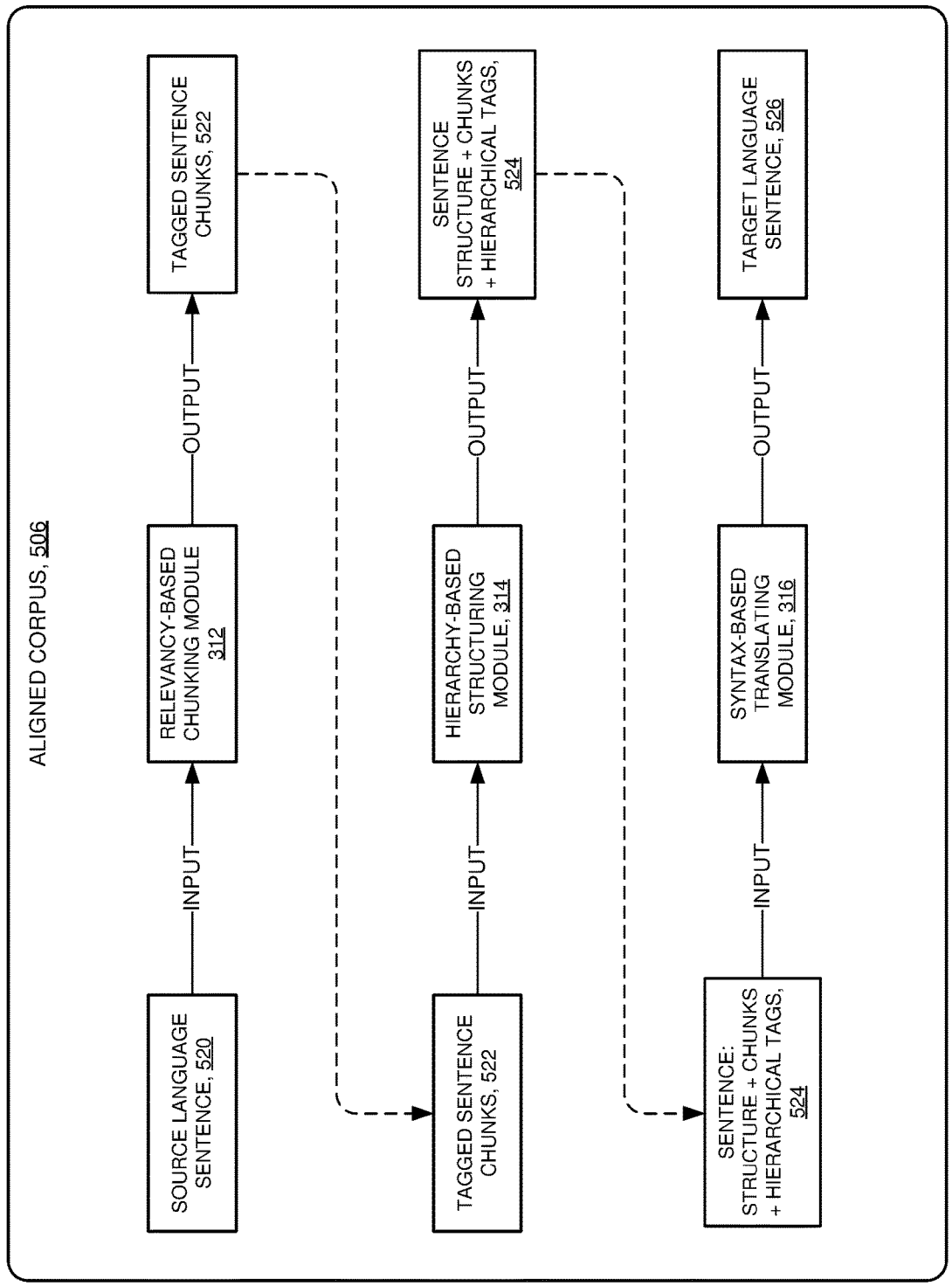
FIG. 5B is a block diagram showing at least a portion of a system workflow in accordance with at least one embodiment of the present invention.

Referring now to FIG. 5B, aligned corpus 506 is a sentence-level corpus in accordance with some embodiments of the present invention. Aligned corpus 506 contains sentences in language pairs, for example a sentence in a first language, and a corresponding equivalent sentence in a second language. Aligned corpus 506 comprises relevancy-based chunking module 312, hierarchy-based structuring module 314, and syntax-based translating module 316.

Relevancy-based chunking module 312 takes sentence 520 as input, and generates tagged sentence chunks 522. In some embodiments, the tags applied to tagged sentence chunks 522 are "part-of-speech" (POS) tags as defined in the Natural Language Toolkit (NLTK; see Bird, Steven, Edward Loper and Ewan Klein (2009), *Natural Language Processing with Python*. O'Reilly Media Inc.). See FIGS. 6A and 6B for an example of tagged sentence chunks, and FIG. 7 for a subset of NLTK POS tags.

Hierarchy-based structuring module 314 takes tagged sentence chunks 522 (the output of relevancy-based chunking module 312) as input, and generates sentence structure+chunks+hierarchical tags 524.

Syntax-based translating module 316 takes the output from hierarchy-based structuring module 314, individually translates the sentence chunks therein, and reconfigures the resulting sentence syntax, based at least in part, on the tags and syntax differences between the source and target languages. Output of syntax-based translating module 316 is target language sentence 526, a translated equivalent of source language sentence 520.

Some embodiments of the present invention use a confidence score to help identify various chunks in a source language text. The confidence score performs at least the following functions: (i) establishes a fault tolerance with respect to parts of speech tagging, since errors may occur when predicting on previous word, next word and other features; and/or (ii) saves resources (such as user involvement) related to collecting all possible combination rules of POS tags for each type of phrase, allowing more flexibility than a conventional "regular expression" (regex) match. Refer to FIG. 7 for meanings of the POS tags.

The following example illustrates calculation of a confidence score:

Consider a source language text: "Given the text in a source language, there is no one single best translation of that text to another language." A subset of initial POS tags (for noun phrases), are applied are as follows: NNP(prop)={'DT+NN', 'NN+NN', 'JJ+NN'}, respectively corresponding to the phrases {'the text', 'source language', 'single translation'}. Here, Freq('JJ')=1, Freq('DT')=1, Freq('NN')=4, meaning tags 'JJ' and 'DT' each appear once, and tag 'NN' appears four times. (See FIGS. 6A and 6B.)

[a] Phrase('DT+NN')=1+4=5, because Freq('DT')=1, and Freq('NN')=4;

[b] Phrase('NN+NN')=4+4=8, because Freq('NN')=4; and

[c] Phrase('JJ+NN')=1+4=5, because Freq('JJ')=1, and Freq('NN')=4.

Some embodiments define a base phrase value (Phrase (base)) as the maximum of phrases [a], [b], and [c]. Thus, Phrase(base)=max{5, 8, 5}=8.

Some embodiments define a benchmark value as a ratio of {minimum of phrases [a], [b], and [c]} divided by {maximum of phrases [a], [b], and [c]}. Thus, for example, a noun phrase benchmark, NNP(benchmark)=min{5, 8, 5}/max{5, 8, 5}=5/8.

Now consider the tags for the entire sentence: 'VBN DT NN IN DT NN NN, EX VBZ DT CD JJ JJS NN IN DT NN TO DT NN'. Relevancy-based chunking module 312 (see FIG. 5B) divides the sentence, based on functional tagged words, into possible chunks as follows: $Chunk_1$='DT NN'; $Chunk_2$='DT NN NN'; $Chunk_3$='DT CD JJ JJS NN'; $Chunk_4$='DT NN'; and $Chunk_5$='DT NN'.

Relevancy-based chunking module 312 (see FIG. 5B) determines confidence scores as follows: Conf(benchmark, $Chunk_{1/4/5}$)=(5/8)/(5/8)=1; Conf(benchmark, $Chunk_2$)=(5/8)/((5+8)/(8×2))=(5/8)/(13/16)=0.76; and Conf(benchmark, $Chunk_3$)=(5/8)/((1+1+1+4)/8)=(5/8)/(7/8)=0.71. Therefore, in this example case, relevancy-based chunking module 312 identifies a noun phrase if the confidence score is higher than a default 0.70 (or any user defined value, if desired, to achieve a finer or courser determination (respectively, greater or lesser confidence).

Figure 6A:
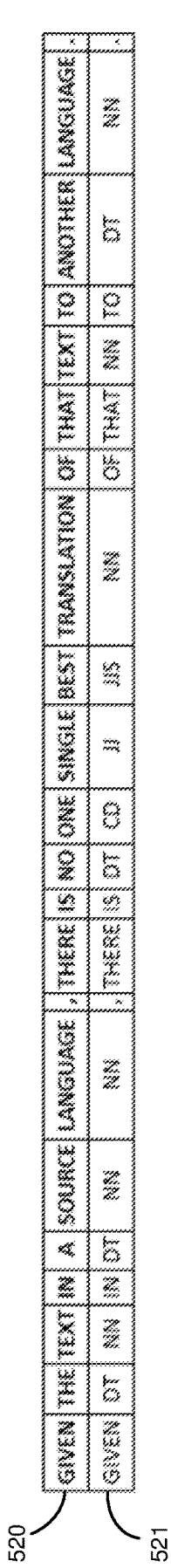
FIG. 6A shows at least a portion of an example translation, implemented by a chunking module, in accordance with at least one embodiment of the present invention.
Figure 6B:
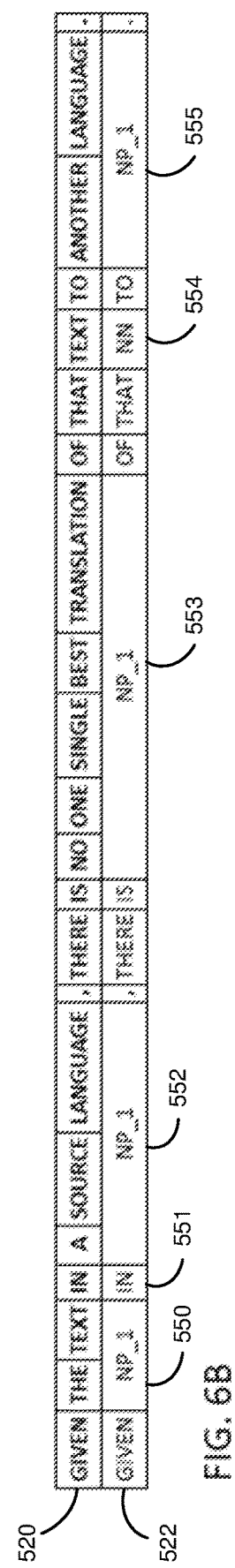
FIG. 6B shows at least a portion of an example translation, implemented by a hierarchy module, in accordance with at least one embodiment of the present invention.

FIGS. 6A and 6B are block diagrams showing output of relevancy-based chunking module 312 operating in accordance with some embodiments of the present invention.

Some embodiments train relevancy-based chunking module 312 to identify noun phrases and verb phrases. Once the training has progressed to a sufficient degree, relevancy-based chunking module 312 takes sentence 520 as input, applies part of speech (POS) tags to certain words (FIG. 6A, row 521), and produces level-1 tagged sentence chunks (FIG. 6B, 550, 551, 552, 553, 554, and 555) as output.

POS tags applied by relevancy-based chunking module 312, such as "DT", "NN", "CD", etc., are based on the Natural Language Toolkit (NLTK), a component of which is a "part-of-speech tagger", sometimes referred to as a grammatical tagger. Tagging of a word denotes a part of speech represented by the word, based on a combination of the word definition, and the context in which the word is found in the text being tagged. A subset of POS tags defined in the NLTK are given in FIG. 7, for reference.

In the example, sentence 520 reads as follows: "Given the text in a source language, there is no one single best translation of that text to another language." Relevancy-based chunking module 312 identifies referential and functional words in sentence 520, and applies the following tags to the referential words: "DT" (applied to "the", "a", "no", and "another"); "NN" (applied to "text" (×2), "source", "language" (×2), and "translation"); "CD" (applied to "one"), "JJ" (applied to "single"), and "JJS" (applied to "best"). See row 521, of FIG. 6A.

In the hierarchy structuring model, the "NP", "NP_1", "NP_2" tags refer to noun phrases with different levels. A level-1 noun phrase (NP_1) is a combination of simple NLTK POS tags. A level-2 (second level) noun phrase (NP_2) is a combinations of simple tags and/or level-1 tags. Level-3 (third level, and above) noun phrases are generated in the same way, building upon (combining) simple tags and/or noun phrases of previous levels. In other words for example, a second level noun phrase (NP_2) replaces a combination of simple tags and/or level-1 (first level) tags.

FIG. 6B shows results of a sentence chunking operation performed on sentence 520 by relevancy-based chunking module 312, operating in accordance with some embodiments of the present invention. Shown as level-1 tagged sentence chunks 522 (bottom row of FIG. 6B), relevancy-based chunking module 312 combines at least some of the referential words into chunks, and tags these chunks as level-1 noun phrases ("NP_1") as follows: (i) "the text" (550); (ii) "a source language" (552); (iii) "no one single best translation" (553); (iv) "[of that] text" (554) and (v) "another language" (555).

Figure 6C:
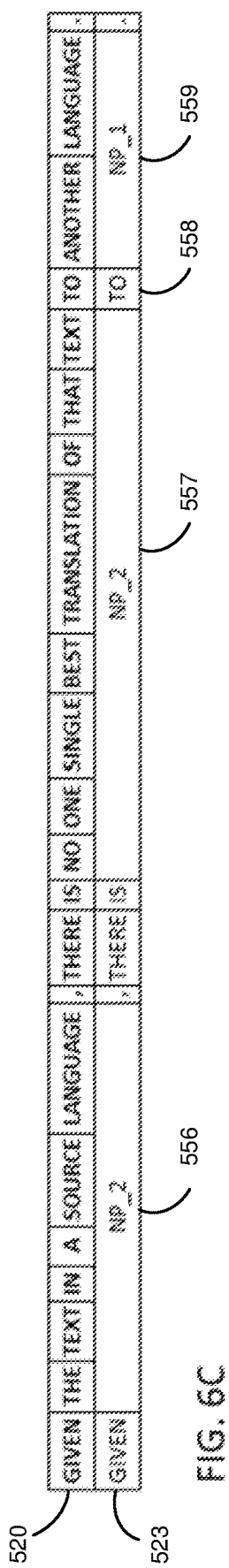
FIG. 6C shows at least a portion of an example translation, implemented by a hierarchy module, in accordance with at least one embodiment of the present invention.

FIG. 6C shows a result produced by hierarchy-based structuring module 314 operating in accordance with some embodiments of the present invention. Hierarchy-based structuring module 314 builds on the output from relevancy-based chunking module 312 (level-1 tagged sentence chunks 522, see FIG. 6B above), to output level-2 chunks 523 (bottom row of FIG. 6C), which identifies sentence structure, level-2 sentence chunks, and hierarchical tags. Hierarchy-based structuring module 314 generates level-2 chunks 523 by combining at least one level-1 noun phrase with simple tag(s) or more level-1 noun phrases. In particular, hierarchy-based structuring module 314 combines chunks 550 ("the text"), 551 ("in"), and 552 ("a source language"), (see FIG. 6B) to generate NP_2 chunk 556 ("the text in a source language"). Hierarchy-based structuring module 314 further combines chunks 553 ("no one single best translation"), 554 ("[of that] text"), and 555 ("another language"), (see FIG. 6B), to generate NP_2 chunk 557 ("no one single best translation of that text").

Figure 6D:
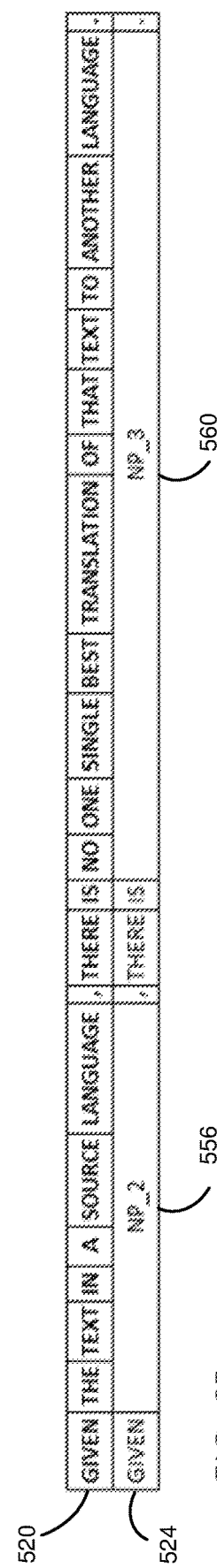
FIG. 6D shows at least a portion of an example translation, implemented by a hierarchy module, in accordance with at least one embodiment of the present invention.

FIG. 6D shows a further result produced by hierarchy-based structuring module 314 operating in accordance with some embodiments of the present invention. Hierarchy-based structuring module 314 combines NP_2 chunk 557, word 558 ("to"), and NP_1 559 ("another language") to generate NP_3 chunk 560 ("no one single best translation of that text to another language"). See level-3 noun phrases, comprising structure+chunks+hierarchical tags 524 (bottom row of FIG. 6D).

Figure 6E:
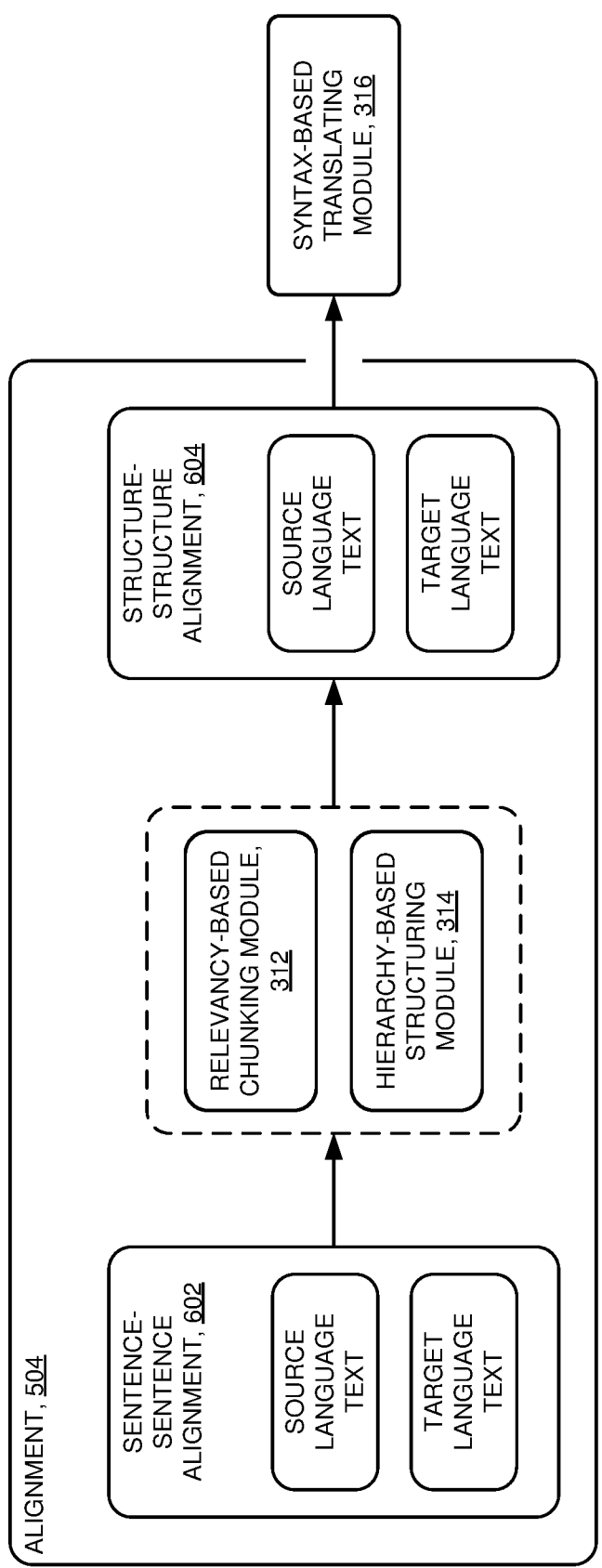
FIG. 6E is a block diagram showing at least a portion of a translating module training method, based on structure-level alignments, in accordance with at least one embodiment of the present invention.

FIG. 6E is a block diagram showing an approach, in accordance with some embodiments of the present invention, for training the translating module on structure-level alignment. Sentence-sentence alignment 602 provides a corpus of sentences in a source language, paired with equivalent respectively corresponding sentences in a target language. Relevancy-based chunking module 312 and hierarchy-based structuring module 314, collectively, generate structure-structure alignment 604, which has information indicating differences in the grammatical structures of the sentence pairs. Syntax-based translating module 316, once having made word and phrase translations from the source language to the target language, then reconfigures the target language text according to the structural difference information present in structure-structure alignment 604.

FIG. 6F shows a result produced by syntax-based translating module 316 operating in accordance with some embodiments of the present invention. Syntax-based translating module 316 translates level-1 tagged sentence chunks 522 (NN and NP_1 chunks, FIG. 6B) into the target language. The NN and NP_1 chunks are as follows (see FIG. 6B): "the text" (550); "a source language" (552); "no one single best translation" (553); "[of that] text" (554); and "another language" (555).

In some embodiments, syntax-based translating module 316 solves an ambiguous pronoun problem by searching the sentence for more than one occurrence of the ambiguous pronoun. For example, in the example of FIGS. 6A through 6H, the second occurrence of the noun "text" ("that text") could be considered ambiguous. Syntax-based translating module 316 then searches for another occurrence of the word "text" and finds "the text" earlier in the sentence, thereby establishing antecedent basis for "that text" and resolving the ambiguity.

FIG. 6G shows a further result produced by syntax-based translating module 316 operating in accordance with some embodiments of the present invention. Syntax-based translating module 316 proceeds to combine the level-1 NN and NP_1 noun phrases (as tagged in FIG. 6B) into level-2 noun phrases as shown in FIG. 6C. Syntax-based translating module 316 further switches the ordering of the translated chunks based on differences between the syntax of the source and target languages, as represented by arrows (561, 562, 563, and 564).

FIG. 6H shows a completed translation result produced by syntax-based translating module 316 operating in accordance with some embodiments of the present invention. Syntax-based translating module 316 combines the level-2 noun phrases (as tagged in FIG. 6C) into level-3 noun phrases (as tagged in FIG. 6D). Syntax-based translating module 316 further switches the ordering of the translated chunks in accordance with syntax of the target language, as represented by arrows (565, 566, and 567). The translated result, shown in FIG. 6H, row 568 comprises the character sets (in the sequential order shown): 562A, 561A, 565A, 569, 567A, and 566A.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method comprising:
   classifying, by the one or more processors, a plurality of elements of a source text expressed in a source language based on respectively corresponding grammatical functions thereof;
   generating, by the one or more processors, an interim target text expressed in the target language by translating the source text expressed in the source language to the target language using respective information included in each of a source language syntax table and a target language syntax table;
   reconfiguring, by the one or more processors, the interim target text expressed in the target language, based on target language syntax rules and conventions, wherein reconfiguring the interim target text expressed in the target language includes:
      re-ordering a first combination of elements of a first hierarchical level of the interim target text to generate a re-ordered interim target text and
      re-ordering a second combination of elements of a second hierarchical level of the re-ordered interim target text to generate a target text, wherein the second combination of elements includes at least a portion of the re-ordered first combination of elements; and
   outputting, by the one or more processors, the target text.

2. The method of claim 1, wherein each of the plurality of elements comprises a written expression selected from the group consisting of:
   a word;
   a phrase;
   a character that represents at least a part of a word; and
   a character that represents at least a part of a phrase.

3. The method of claim 1, wherein classifying the plurality of elements further comprises:
   determining, by the one or more processors, a first grammatical function represented by a first element, based on the source language syntax rules and conventions;
   associating, by the one or more processors, a first part-of-speech tag with the first element based on the first grammatical function;
   determining, by the one or more processors, a second grammatical function represented by a second element, based on the source language syntax rules and conventions; and
   associating, by the one or more processors, a second part-of-speech tag with the second element based on the second grammatical function.

4. The method of claim 3, further comprising:
   determining, by the one or more processors, based on a combination of the first part-of-speech tag and the second part-of-speech tag, that the first element and the second element are grammatically linked; and
   in response to determining that the first element and the second element are grammatically linked, combining the first element and the second element to form a phrase.

5. The method of claim 1, further comprising:
   generating, by the one or more processors, at least two translated phrases, wherein each translated phrase, of the at least two translated phrases, has a syntactical structure that differs from a respective syntactical structure of each other translated phrase of the at least two translated phrases;
   sending, by the one or more processors, the source text, and the at least two translated phrases, for review by a human reviewer;
   receiving, by the one or more processors, information indicating a best translated phrase; and
   modifying, by the one or more processors, at least one of the source language syntax table and the target language syntax table based on information with respect to the best translated phrase.

6. A computer program product comprising:
   one or more computer readable storage media, and program instructions collectively stored on the one or more computer readable storage media, the program instructions comprising instructions programmed to perform:

classifying a plurality of elements of a source text expressed in a source language based on respectively corresponding grammatical functions thereof;

generating, by the one or more processors, an interim target text expressed in the target language by translating the source text expressed in the source language to the target language using respective information included in each of a source language syntax table and a target language syntax table;

reconfiguring the interim target text expressed in the target language, based on the target language syntax rules and conventions, wherein reconfiguring the interim target text expressed in the target language includes:

re-ordering a first combination of elements of a first hierarchical level of the interim target text to generate a re-ordered interim target text; and re-ordering a second combination of elements of a second hierarchical level of the re-ordered interim target text to generate a target text, wherein the second combination of elements includes at least a portion of the re-ordered first combination of elements; and outputting the target text.

7. The computer program product of claim 6, wherein each of the plurality of elements comprises a written expression selected from the group consisting of:

a word;
a phrase;
a character that represents at least a part of a word; and
a character that represents at least a part of a phrase.

8. The computer program product of claim 6, wherein classifying the plurality of elements further comprises instructions programmed to perform:

determining a first grammatical function represented by a first element, based on the source language syntax rules and conventions;

associating a first part-of-speech tag with the first element based on the first grammatical function;

determining a second grammatical function represented by a second element, based on the source language syntax rules and conventions; and associating a second part-of-speech tag with the second element based on the second grammatical function.

9. The computer program product of claim 8, further comprising instructions programmed to perform:

determining, based on a combination of the first part-of-speech tag and the second part-of-speech tag, that the first element and the second element are grammatically linked; and in response to determining that the first element and the second element are grammatically linked, combining the first element and the second element to form a phrase.

10. The computer program product of claim 6, further comprising instructions programmed to perform:

generating at least two translated phrases, wherein each translated phrase, of the at least two translated phrases, has a syntactical structure that differs from a respective syntactical structure of each other translated phrase of the at least two translated phrases;

sending the source text, and the at least two translated phrases, for review by a human reviewer;

receiving information indicating a best translated phrase; and modifying at least one of the source language syntax table and the target language syntax table based on information with respect to the best translated phrase.

11. A computer system comprising:
a processor set; and
one or more computer readable storage media;
wherein:
the processor set is structured, located, connected and/or programmed to run program instructions stored on the one or more computer readable storage media; and the program instructions include instructions programmed to perform:

classifying a plurality of elements of a source text expressed in a source language based on respectively corresponding grammatical functions thereof;

generating, by the one or more processors, an interim target text expressed in the target language by translating the source text expressed in the source language to the target language using respective information included in each of a source language syntax table and a target language syntax table;

reconfiguring the interim target text expressed in the target language, based on the target language syntax rules and conventions, wherein reconfiguring the interim target text expressed in the target language includes:

re-ordering a first combination of elements of a first hierarchical level of the interim target text to generate a re-ordered interim target text; and re-ordering a second combination of elements of a second hierarchical level of the re-ordered interim target text to generate a target text, wherein the second combination of elements includes at least a portion of the re-ordered first combination of elements; and outputting the target text.

12. The computer system of claim 11, wherein each of the plurality of elements comprises a written expression selected from the group consisting of:

a word;
a phrase;
a character that represents at least a part of a word; and
a character that represents at least a part of a phrase.

13. The computer system of claim 11, wherein classifying the plurality of elements further comprises instructions programmed to perform:

determining a first grammatical function represented by a first element, based on the source language syntax rules and conventions;

associating a first part-of-speech tag with the first element based on the first grammatical function;

determining a second grammatical function represented by a second element, based on the source language syntax rules and conventions; and associating a second part-of-speech tag with the second element based on the second grammatical function.

14. The computer system of claim 13, further comprising instructions programmed to perform:

determining, based on a combination of the first part-of-speech tag and the second part-of-speech tag, that the first element and the second element are grammatically linked; and in response to determining that the first element and the second element are grammatically linked, combining the first element and the second element to form a phrase.

15. The computer system of claim 11, further comprising instructions programmed to perform:
generating at least two translated phrases, based on information in a source language syntax table and information in a target language syntax table, wherein each translated phrase, of the at least two translated phrases, has a syntactical structure that differs from a respective syntactical structure of each other translated phrase of the at least two translated phrases;
sending the source text, and the at least two translated phrases, for review by a human reviewer;
receiving information indicating a best translated phrase; and
modifying at least one of the source language syntax table and the target language syntax table based on information with respect to the best translated phrase.

* * * * *